United States Patent
Wagle et al.

(10) Patent No.: US 10,927,284 B2
(45) Date of Patent: *Feb. 23, 2021

(54) INVERT EMULSION DRILLING FLUIDS WITH FATTY ACID AND FATTY AMINE RHEOLOGY MODIFIERS

(71) Applicant: SAUDI ARABIAN OIL COMPANY, Dhahran (SA)

(72) Inventors: Vikrant Wagle, Abqaiq (SA);
Abdullah Al-Yami, Dhahran (SA);
Khawlah Alanqari, Dhahran (SA);
Sara Alkhalaf, Dhahran (SA)

(73) Assignee: SAUDI ARABIAN OIL COMPANY

( * ) Notice: Subject to any disclaimer, the term of this patent is extended or adjusted under 35 U.S.C. 154(b) by 0 days.

This patent is subject to a terminal disclaimer.

(21) Appl. No.: 16/743,318

(22) Filed: Jan. 15, 2020

(65) Prior Publication Data
US 2020/0148934 A1    May 14, 2020

Related U.S. Application Data

(60) Continuation-in-part of application No. 16/259,540, filed on Jan. 28, 2019, now Pat. No. 10,570,326, (Continued)

(51) Int. Cl.
*C09K 8/36* (2006.01)
*C09K 8/03* (2006.01)
(Continued)

(52) U.S. Cl.
CPC ............... *C09K 8/36* (2013.01); *C09K 8/032* (2013.01); *C09K 8/035* (2013.01); *E21B 43/16* (2013.01)

(58) Field of Classification Search
None
See application file for complete search history.

(56) References Cited

U.S. PATENT DOCUMENTS 7,696,131 B2    4/2010    Oyler et al.
8,727,005 B1    5/2014    Gamage et al.
(Continued)

FOREIGN PATENT DOCUMENTS

WO    2013106213 A1    7/2013
WO    2015006101 A1    1/2015
WO    2016189019 A1    12/2016

OTHER PUBLICATIONS

International Search Report and Written Opinion for International Application No. PCT/US2017/063850; dated Mar. 19, 2018; 10 pages.
(Continued)

*Primary Examiner* — Angela M DiTrani Leff
(74) *Attorney, Agent, or Firm* — Bracewell LLP; Constance Gall Rhebergen

(57) ABSTRACT

Various invert emulsion drilling fluid compositions. One such invert emulsion drilling fluid is a water in oil emulsion, which can include an invert emulsifier to stabilize the water in oil emulsion, a C16 to C18 saturated linear alpha carboxylic acid, a fatty dimer diamine, a filtration control agent, a weighting agent including manganese tetroxide, and a bridging agent including calcium chloride. The invert emulsion drilling fluids can be formulated to be substantially free of clay.

36 Claims, 3 Drawing Sheets

Related U.S. Application Data which is a division of application No. 15/827,404, filed on Nov. 30, 2017, now Pat. No. 10,457,847.

(60) Provisional application No. 62/428,361, filed on Nov. 30, 2016.

(51) Int. Cl.
*C09K 8/035* (2006.01)
*E21B 43/16* (2006.01)

(56) References Cited

U.S. PATENT DOCUMENTS

| | | | |
|---|---|---|---|
| 8,936,111 B2 | 1/2015 | Maghrabi et al. | |
| 10,457,847 B2* | 10/2019 | Wagle | C09K 8/035 |
| 2012/0129735 A1 | 5/2012 | Dino et al. | |
| 2013/0303411 A1* | 11/2013 | Wagle | C09K 8/035 |
| | | | 507/129 |
| 2014/0066341 A1 | 3/2014 | Dino et al. | |
| 2014/0352969 A1 | 12/2014 | Chung et al. | |
| 2015/0111792 A1 | 4/2015 | Hurd et al. | |
| 2015/0376490 A1 | 12/2015 | Dino et al. | |
| 2016/0145487 A1 | 5/2016 | Alam et al. | |
| 2016/0160112 A1 | 6/2016 | Wagle et al. | |
| 2016/0230070 A1 | 8/2016 | Wagle et al. | |
| 2018/0148626 A1* | 5/2018 | Wagle | C09K 8/032 |
| 2018/0223157 A1* | 8/2018 | Al-Yami | E21B 21/00 |
| 2019/0163386 A1 | 5/2019 | Shukla et al. | |

OTHER PUBLICATIONS

Young, et al., Society of Petroleum Engineers Oil and Gas India Conference and Exhibition; Mar. 28-30, 2012; Mumbai, India.

Zolfaghari, et al., Demulsification techniques of water-in-oil and oil-in-water emulsions in petroleum industry; Separation and Purification Technology; vol. 170, pp. 377-407; Elsevier; Oct. 1, 2016.

\* cited by examiner

INVERT EMULSION DRILLING FLUIDS WITH FATTY ACID AND FATTY AMINE RHEOLOGY MODIFIERS

CROSS-REFERENCE TO RELATED APPLICATIONS

This application is a continuation-in-part application of U.S. application Ser. No. 16/259,540 filed on Jan. 28, 2019, which is a divisional application of U.S. application Ser. No. 15/827,404 filed on Nov. 30, 2017, which claims the benefit of and priority to the U.S. Provisional Application No. 62/428,361 filed on Nov. 30, 2016.

FIELD

The disclosure relates to drilling fluids for oil and gas exploration. More specifically, the disclosure relates to the composition and use of invert emulsion fluids as rheology modifiers.

BACKGROUND

A conventional invert emulsion fluid for drilling in oil and gas exploration generally includes clay in the formulation, where the clay acts as the primary rheology (viscosity) modifier. The clay can be organophilic clay or organoclay. Drilling fluids formulated with an organophilic clay can have a degradation of rheology properties over time. In other words, the organophilic clay formulated fluids can have a loss of viscosity over time, owing to the inability of the clay to maintain a necessary level of viscosity. One solution to the loss of viscosity with time is to add an excess amount of an organophilic clay to the drilling fluid, or to add an excess of low gravity solids (LGS) to the drilling fluid, or both. However, adding excess clay, or LGS, or both can increase the cost of drilling and can severely impact other important drilling fluid properties. These impacts on cost, or fluid property, or both can necessitate further costly treatments downhole or to the drilling fluid as remedies. For example, the addition of excess LGS can increase the plastic viscosity and the solids volume percentage, which can impact the rate of penetration of a drill bit into a formation, thus increasing the cost of drilling.

Drilling fluid rheology can change with increasing well depth as a result of changes in pressure and temperature. Such changes can cause changes in the equivalent circulating density (ECD) while drilling advances down through a formation. These fluctuations in ECD can lead to fracture of the formation when operating in a narrow window of pore pressure and fracture gradient. This can lead to formation damage and mud losses, thus increasing drilling costs. The use of thinner fluids to minimize rheology fluctuations, in general, can lead to lesser ECD; however, the fluid rheology may need to be such that the fluid properties enable cuttings removal and help to suspend drill solids. There are competing needs of greater viscosity for cuttings removal and suspension of solids versus lesser viscosity for better ECD.

SUMMARY

A need has been recognized for an invert emulsion drilling fluid with improved rheology and with stability of rheology during drilling to balance the needs of better ECD with cuttings removal and solids suspension. Certain embodiments relate to invert emulsion drilling fluid compositions and methods of drilling a wellbore in a formation using the invert emulsion drilling fluid compositions. In various embodiments, an invert emulsion drilling fluid can include a water in oil emulsion; an invert emulsifier to stabilize the water in oil emulsion in an amount operable to stabilize the water in oil emulsion; a fatty acid having at least eight carbons and at least one carboxylic acid group; a 36 carbon fatty dimer diamine; a filtration control agent; and an inorganic mineral including one or more of lime, calcium chloride, and barite (barium sulfate, $BaSO_4$).

In various embodiments, the fatty acid can be a 36 carbon dimer diacid having the general formula illustrated by Formula 1.

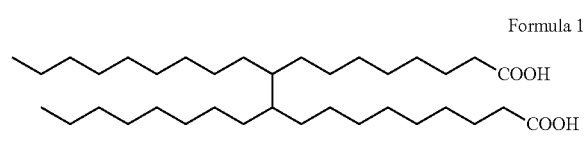

Formula 1

In various embodiments, the 36 carbon fatty dimer diamine can have the general formula illustrated by Formula 2.

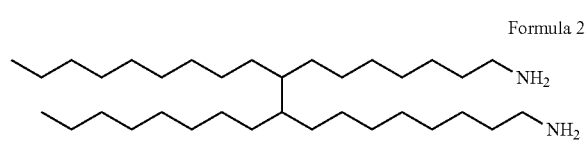

Formula 2

In various embodiments, the fatty acid can be a mixture of C16 and C18 saturated linear alpha carboxylic acids and can include a C18 fatty acid as illustrated by Formula 3.

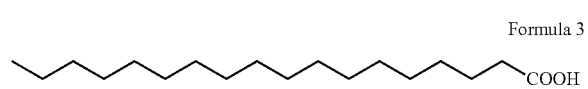 [SMILES: CCCCCCCCCCCCCCCCCC(=O)O]

Formula 3

In various embodiments, the fluid can be formulated to have an oil to water ratio from 5:95 to 95:5 by volume. In various embodiments, the fluid can be formulated to have a density of 63 to 164 $lbm/ft^3$ (pound mass per cubic foot). In various embodiments, the fluid can be formulated without clay and without LGS. In various embodiments, the fluid can be formulated to have a calcium chloride ($CaCl_2$) water phase salinity concentration of 200 to 390 thousand parts per million. In various embodiments, the fluid can be formulated to have 2 to 25 lbm/bbl (pound mass per barrel) of the invert emulsifier. In various embodiments, the fluid can be formulated to have 0.5 to 5 lbm/bbl of lime. In various embodiments, the fluid can be formulated to have at least 0.5 to 5 lbm/bbl of the 36 carbon dimer diacid. In various embodiments, the fluid can be formulated to have 0.25 to 5 lbm/bbl of the filtration control agent. In various embodiments, the fluid can be formulated to have at least 0.25 lbm/bbl of the 36 carbon fatty dimer diamine. In various embodiments, the oil can be selected from the group consisting of mineral oil, diesel fuel, and synthetic oil, and combinations thereof. In various embodiments, the fluid can be formulated to have a yield point greater than 15 $lbf/100\ ft^2$ (pound force per hundred square feet). In various embodiments, the fluid can be formulated to have a low shear yield point greater than 7 $lbf/100\ ft^2$.

In various embodiments, a method of drilling a wellbore with an invert emulsion fluid can comprise drilling in a formation using an invert emulsion fluid, wherein the fluid includes a water in oil emulsion; an invert emulsifier to stabilize the water in oil emulsion in an amount operable to stabilize the water in oil emulsion; a fatty acid having at least eight carbons and at least one carboxylic acid group; a 36 carbon fatty dimer diamine; a filtration control agent; and an inorganic mineral including one or more of lime, calcium chloride, and barite. In various embodiments, the fatty acid can be a 36 carbon dimer diacid having the formula illustrated by Formula 1. In various embodiments, the 36 carbon fatty dimer diamine can have the formula illustrated by Formula 2. In various embodiments, the fatty acid can have at least eight carbons and at least one carboxylic acid group. In various embodiments, the fatty acid can be a mixture of C16 and C18 saturated linear alpha carboxylic acids. In various embodiments, the fluid can have an oil to water ratio from 5:95 to 95:5 by volume. In various embodiments, the fluid can have a density of 63 to 164 lbm/ft$^3$. In various embodiments, the fluid can have a $CaCl_2$ water phase salinity concentration of 200 to 390 thousand parts per million. In various embodiments, the fluid can have 2 to 25 lbm/bbl of the invert emulsifier. In various embodiments, the fluid can have 0.5 to 5 lbm/bbl of lime. In various embodiments, the fluid can have at least 0.5 to 5 lbm/bbl of the 36 carbon dimer diacid. In various embodiments, the fluid can have 0.25 to 5 lbm/bbl of the filtration control agent. In various embodiments, the fluid can have at least 0.25 lbm/bbl of the 36 carbon fatty dimer diamine. In various embodiments, the oil can be selected from the group consisting of mineral oil, diesel fuel, and synthetic oil, and combinations thereof. In various embodiments, the fluid can have a yield point greater than 15 lbf/100 ft$^2$. In various embodiments, the fluid can have a low shear yield point greater than 7 lbf/100 ft$^2$.

Embodiments of the disclosure provide an invert emulsion drilling fluid. The invert emulsion drilling fluid includes a water in oil emulsion, an invert emulsifier to stabilize the water in oil emulsion in an amount operable to stabilize the water in oil emulsion, a C16 to C18 saturated linear alpha carboxylic acid, a fatty dimer diamine, a filtration control agent, a weighting agent including manganese tetroxide, and a bridging agent including calcium carbonate.

In various embodiments, the invert emulsion drilling fluid further includes a 36 carbon dimer diacid having the formula illustrated by Formula 1. In various embodiments, the fatty dimer diamine has the formula illustrated by Formula 4.

Formula 4

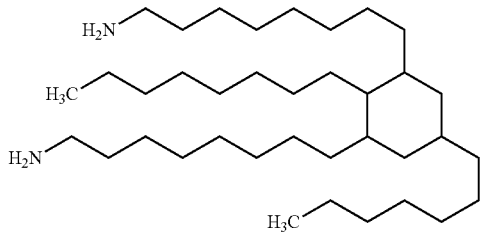

In various embodiments, the invert emulsion drilling fluid is formulated to have an oil to water ratio from 5:95 to 95:5 by volume. In various embodiments, the invert emulsion drilling fluid is formulated to have a density ranging from 65 to 150 lbm/ft$^3$. In various embodiments, the invert emulsion drilling fluid is formulated without organoclay. In various embodiments, the bridging agent is a mixture of acid-soluble marble having median particle sizes of 25, 50, and 150 microns in an amount of 5 to 15, 20 to 30, and 2 to 6 lbm/bbl, respectively. In various embodiments, the invert emulsion drilling fluid is formulated to have the invert emulsifier in an amount of 2 to 25 lbm/bbl. In various embodiments, the invert emulsion drilling fluid further includes lime. In various embodiments, the invert emulsion drilling fluid is formulated to have the lime in an amount of 0.5 to 5 lbm/bbl. In various embodiments, the invert emulsion drilling fluid is formulated to have the 36 carbon dimer diacid in an amount of 0.5 to 5 lbm/bbl. In various embodiments, the invert emulsion drilling fluid is formulated to have the filtration control agent in an amount of 0.25 to 5 lbm/bbl. In various embodiments, the invert emulsion drilling fluid is formulated to have a 6 rpm reading of at least 8 centipoise (cP). In various embodiments, the invert emulsion drilling fluid is formulated to have the fatty dimer diamine in an amount of 1 to 10 lbm/bbl. In various embodiments, the oil includes mineral oil, diesel fuel, and synthetic oil, and combinations thereof. In various embodiments, the invert emulsion drilling fluid is formulated to have a yield point greater than 15 lbf/100 ft$^2$. In various embodiments, the invert emulsion drilling fluid is formulated to have a low shear yield point greater than 7 lbf/100 ft$^2$. In various embodiments, the invert emulsion drilling fluid is formulated to have the weighting agent in an amount of 50 to 600 lbm/bbl. In various embodiments, the weighting agent further includes barite, calcium carbonate, and combinations of the same. In various embodiments, the invert emulsion drilling fluid has the C16 to C18 saturated linear alpha carboxylic acid in an amount of 0.1 to 0.5 lbm/bbl.

Embodiments of the disclosure also provide a method of drilling a wellbore with an invert emulsion drilling fluid. The method includes the step of drilling in a formation using the invert emulsion drilling fluid. The invert emulsion drilling fluid includes a water in oil emulsion, an invert emulsifier to stabilize the water in oil emulsion in an amount operable to stabilize the water in oil emulsion, a C16 to C18 saturated linear alpha carboxylic acid, a fatty dimer diamine, a filtration control agent, a weighting agent including manganese tetroxide, and a bridging agent including calcium carbonate.

In various embodiments, the invert emulsion drilling fluid further includes a 36 carbon dimer diacid having the formula illustrated by Formula 1. In various embodiments, the fatty dimer dimine has the formula illustrated by Formula 4. In various embodiments, the invert emulsion drilling fluid is formulated to have an oil to water ratio from 5:95 to 95:5 by volume. In various embodiments, the invert emulsion drilling fluid is formulated to have a density ranging from 65 to 150 lbm/ft$^3$. In various embodiments, the invert emulsion drilling fluid is formulated without organoclay. In various embodiments, the bridging agent is a mixture of acid-soluble marble having median particle sizes of 25, 50, and 150 microns in an amount of 5 to 15, 20 to 30, and 2 to 6 lbm/bbl, respectively. In various embodiments, the invert emulsion drilling fluid is formulated to have the invert emulsifier in an amount of 2 to 25 lbm/bbl. In various embodiments, the invert emulsion drilling fluid further includes lime. In various embodiments, the invert emulsion drilling fluid is formulated to have the lime in an amount of 0.5 to 5 lbm/bbl. In various embodiments, the invert emulsion drilling fluid is formulated to have the 36 carbon dimer diacid in an amount of 0.5 to 5 lbm/bbl. In various embodiments, the invert emulsion drilling fluid is formulated to have the filtration control agent in an amount of 0.25 to 5 lbm/bbl. In various embodiments, the invert emulsion drilling fluid is formulated to have a 6 rpm reading of at least 8 cP. In various embodiments, the invert emulsion drilling fluid is formulated to have the fatty dimer diamine in an amount of 1 to 10 lbm/bbl. In various embodiments, the oil includes mineral oil, diesel fuel, and synthetic oil, and combinations thereof. In various embodiments, the invert emulsion drilling fluid is formulated to have a yield point greater than 15 lbf/100 ft$^2$. In various embodiments, the invert emulsion drilling fluid is formulated to have a low shear yield point greater than 7 lbf/100 ft$^2$. In various embodiments, the invert emulsion drilling fluid is formulated to have the weighting agent in an amount of 50 to 600 lbm/bbl. In various embodiments, the weighting agent further includes barite, calcium carbonate, and combinations of the same. In various embodiments, the invert emulsion drilling fluid has the C16 to C18 saturated linear alpha carboxylic acid in an amount of 0.1 to 0.5 lbm/bbl.

BRIEF DESCRIPTION OF THE DRAWINGS

Embodiments will be readily understood by the following detailed description in conjunction with the accompanying drawings. Embodiments are illustrated by way of example and not by way of limitation in the accompanying drawings.

DETAILED DESCRIPTION

Figure 1:
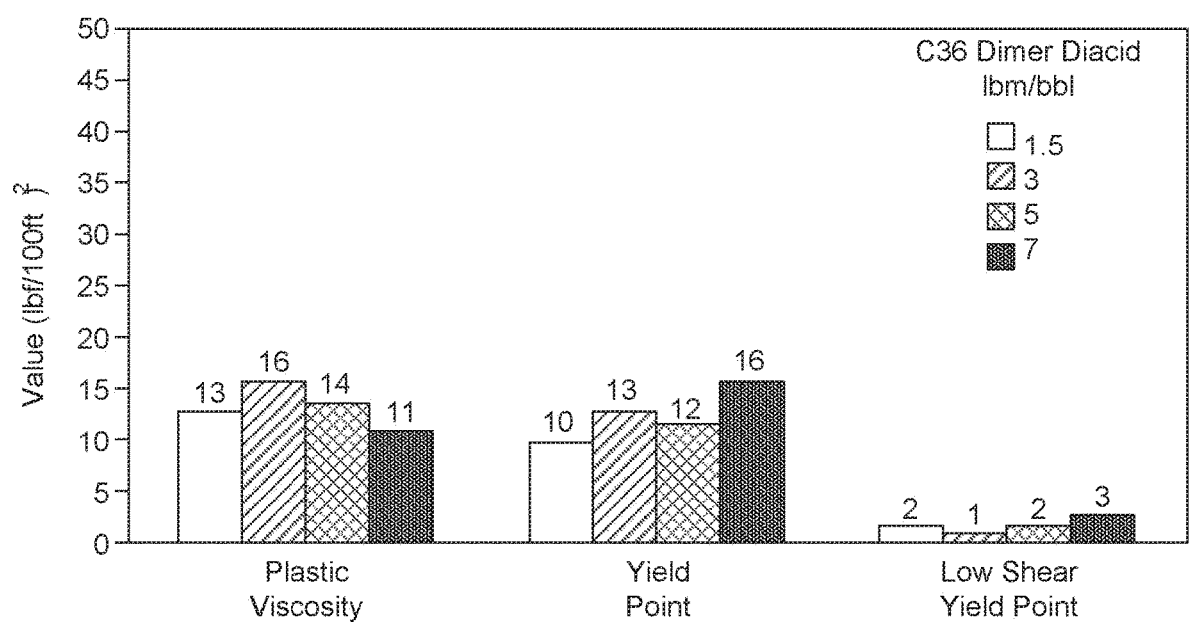
FIG. 1 is a graphical representation of the plastic viscosity (PV), the yield point (YP), and the low shear yield point (LSYP) data of the four fluids described in Table 1A, in accordance with various embodiments.

Embodiments of the present disclosure describe invert emulsion fluids (IEFs) for drilling in oil and gas exploration, where the fluids have a combination of fatty acid and fatty amine compounds for rheology modification. In some embodiments, the fluids can be substantially free of clay formulations. Further embodiments are described and disclosed here.

In the following description, numerous specific details are set forth in order to provide a thorough understanding of the various embodiments. In other instances, well-known processes and methods may not been described in particular detail in order not to unnecessarily obscure the embodiments described here. Additionally, illustrations of embodiments may omit certain features or details in order to not obscure the embodiments described here.

In the following detailed description, reference is made to the accompanying drawings that form a part hereof, wherein like numerals designate like parts throughout, and in which is shown by way of illustration, embodiments in which the subject matter of the present disclosure can be practiced. Other embodiments can be utilized, and logical changes can be made without departing from the scope of the present disclosure. Therefore, the following detailed description is not to be taken in a limiting sense.

The description may use the phrases "in some embodiments," "in various embodiments," "in certain embodiment," or "in embodiments," which may each refer to one or more of the same or different embodiments. Furthermore, the terms "comprising," "including," "having," and the like, as used with respect to embodiments of the present disclosure, are synonymous.

As used here, when an invert emulsion fluid is "substantially free of" a component, the amount of that component present in the composition is such that it will not substantially impair the activity of the invert emulsion fluids and will confer advantages as described in a particular embodiment. For example, if an invert emulsion fluid is said to be substantially free of clay, then the concentration of clay in the invert emulsion fluid, as determined by a statistically significant quantitative evaluation, would be less than 5%. The term "approximately" as used here means within an acceptable error range for the particular value as determined by one of ordinary skill in the art, which will depend in part on how the value is measured or determined, i.e., the limitations of the measurement system.

Various embodiments disclosed here can relate to formulations of invert emulsion fluids (IEFs) that are substantially free of organoclay and contain rheology modifiers, including a combination of a fatty acid and a fatty amine. An absence of organoclay as a primary viscosifier in an IEF can result in a fluid with lesser plastic viscosity and with minimal impact on ECD while providing greater rates of penetration into a formation. An absence of organoclay in a fluid can provide a flatter rheology to the fluid that can be essential for drilling deep wells where the temperature gradient is large. An advantage of various embodiments disclosed here may be that a small concentration of both a dimer fatty diacid and a dimer fatty diamine may provide greater low-end rheology as compared to when the dimer fatty diacid or the dimer fatty diamine are used alone as rheology modifiers in an invert emulsion fluid. A further advantage of various embodiments disclosed here is that these rheology modifier combinations can provide good low-end rheology, thus resulting in reduced barite sag and good hole-cleaning capability. A further advantage of various embodiments disclosed is that the effect of contamination on rheology of IEFs that are substantially free of organoclay may be minimal, and any effect of contamination may be easily treated by drilling fluid conditioners.

Without being bound by theory, the fatty acid and fatty amine may provide a synergistic effect that may provide enhanced low-end rheology properties to IEFs that are substantially free of organoclay, thus increasing hole-cleaning capacity and barite sag resistance of the fluid. This combination of rheology modifiers also can be used in conventional oil-based drilling fluids formulated with an organoclay. In some embodiments, examples of fatty acids can include C32-C36 dimer fatty diacids and C16-C18 fatty acids. In some embodiments, an example of a fatty amine can include a C32-C36 dimer fatty diamine.

Selective rheological properties of an IEF can be predictive as to how the IEF can perform for drilling purposes. These properties include PV, YP, and yield stress. For drilling purposes, PV can be indicative of drilling speed where a lesser PV indicates an ability to drill faster, YP can be indicative of the cuttings carrying capacity of an IEF through an annulus (the hole cleaning ability of the IEF) where a greater YP implies a non-Newtonian fluid with better ability to carry away cuttings compared to a fluid of similar density, and yield stress can provide an indication of the susceptibility of an IEF to barite sag where a greater value generally provides better resistance.

The YP and PV properties can be evaluated using the Bingham plastic (BP) rheology model. YP can be determined by extrapolating the BP model to a shear rate of zero and can represent the stress required to move the fluid. YP can be expressed in the units of lbf/100 ft$^2$. Generally, YP values greater than approximately 15 lbf/100 ft$^2$ can be considered a suitable threshold for drilling purposes for providing suitable ability to carry away cuttings. PV can represent the viscosity of a fluid when extrapolated to infinite shear rate and can be expressed in units of centipoise (cP). PV can indicate the type and concentration of the solids in an IEF, and a lesser PV generally is preferred for a formulation of an IEF as a lesser PV indicates a faster potential drilling rate. Both PV and YP can be calculated using 300 revolutions per minute (rpm) and 600 rpm shear rate readings on a standard oilfield viscometer and can be calculated by Equations 1 and 2.

$$PV = 600 \text{ rpm reading} - 300 \text{ rpm reading} \quad \text{[Equation 1]}$$

$$YP = 300 \text{ rpm reading} - PV \quad \text{[Equation 2]}$$

Regarding yield stress, a value for yield stress can be indicated by the parameter $\tau_0$ (Tau-zero), which is a parameter from the Herschel Buckley (HB) rheology model. Generally, an IEF with a relatively large yield stress value can be expected to provide a better sag resistance, which is desirable for drilling purposes. The parameter $\tau_0$ can be determined by fitting the HB model to a shear stress versus shear rate curve, which can be the dial readings plotted against the corresponding rpm determined on a standard oilfield viscometer. $\tau_0$ can be expressed in similar units as YP. $\tau_0$ can be estimated within reasonable engineering tolerances by calculating a LSYP value using Equation 3.

$$LSYP = 2*(300 \text{ rpm reading}) - 600 \text{ rpm reading} \quad \text{[Equation 3]}$$

An LSYP value equal to or greater than approximately 7 lbf/100 ft$^2$ can be considered an acceptable threshold value for drilling purposes for minimizing barite sag.

Embodiments provided in this disclosure relate to an invert emulsion drilling fluid. In some embodiments, the fluid can contain a water in oil emulsion, an invert emulsifier to stabilize the water in oil emulsion, a carbon 36 dimer diacid having the formula illustrated by Formula 1, a 36 carbon fatty dimer diamine having the formula illustrated by Formula 2, a filtration control agent; and an inorganic mineral including one or more of lime, calcium chloride, and barite.

In various embodiments, the fluid can be formulated without clay. In various embodiments, the fluid can be formulated without organoclay. In various embodiments, the fluid can be formulated without LGS.

In various embodiments, the 36 carbon dimer diacid component can include other fatty diacids of lesser chain length, such as a C34, or greater chain length, such as a C38, or combinations of these fatty acids. In various embodiments, the 36 carbon dimer diacid can have a carbon to carbon linkage between the C9 and the C10 of dimers. In various embodiments, the 36 carbon dimer diacid can have a carbon to carbon linkage between the other locations with the range of C8 to C12 of dimers.

In various embodiments, the fluid can be formulated to be approximately 90 lbm/ft$^3$. In various embodiments, the fluid can be formulated to have from 63 to 134 lbm/ft$^3$.

In various embodiments, the fluid can be formulated to have an oil to water ratio of approximately 5 to 95 to approximately 95 to 5. In various embodiments, the fluid can be formulated to have an oil to water ratio of approximately 5 to 95 to approximately 50 to 50.

In various embodiments, the fluid can be formulated to have a CaCl$_2$ water phase salinity concentration of approximately 250 thousand parts per million. In various embodiments, the fluid can be formulated to have a CaCl$_2$ water phase salinity concentration of approximately 100 to 390 thousand parts per million.

In various embodiments, the fluid can be formulated to have approximately 10 lbm/bbl of the invert emulsifier. In various embodiments, the fluid can be formulated to have approximately 5 to 25 lbm/bbl of the invert emulsifier. In various embodiments, the invert emulsifier can be any suitable invert emulsifier for formulating drilling fluids.

In various embodiments, the fluid can be formulated to have approximately 1.5 lbm/bbl of lime. In various embodiments, the fluid can be formulated to have approximately 0.5 to 5 lbm/bbl of lime.

In various embodiments, the fluid can be formulated to have at least approximately 0.25 lbm/bbl of the 36 carbon dimer diacid. In various embodiments, the fluid can be formulated to have at least approximately 0.25-10 lbm/bbl of the 36 carbon dimer diacid. The concentration of the 36 carbon dimer diacid can be lesser or greater than this range, depending on mud weight.

In various embodiments, the fluid can be formulated to have approximately 2 lbm/bbl of the filtration control agent. In various embodiments, the fluid can be formulated to have approximately 1-10 lbm/bbl of the filtration control agent. In various embodiments, the filtration control agent can be an ADAPTA® filtration control agent, available from Halliburton Company, headquartered in Houston, Tex., USA. In various embodiments, the filtration control agent can be any suitable filtration control agent for formulating drilling fluids.

In various embodiments, the fluid can be formulated to have approximately 28-32 lbm/bbl of calcium chloride. In various embodiments, the fluid can be formulated to have approximately 83-87 lbm/bbl of water. The concentration of calcium chloride and water can vary outside these ranges, depending on additives to the mud and the mud weight.

In various embodiments, the fluid can be formulated to have at least approximately 0.25 lbm/bbl of the 36 carbon fatty dimer diamine. In various embodiments, the fluid can be formulated to have approximately 0.25 to 10 lbm/bbl of the 36 carbon fatty dimer diamine.

In various embodiments, the oil can be selected from the group consisting of mineral oil, diesel fuel, and synthetic oil, and combinations thereof.

In various embodiments, the fluid can be formulated to have approximately 220-225 lbm/bbl of barite. The concentration of barite can depend on the oil to water ratio and mud weight and can be outside this range.

In various embodiments, the fluid can be formulated to have a yield point greater than approximately 15 lbf/100 ft$^2$.

In various embodiments, the fluid can be formulated to have a low shear yield point greater than approximately 7 lbf/100 ft$^2$.

In various embodiments, an invert emulsion drilling fluid can be formulated to include a water in oil emulsion with a ratio of oil to water of approximately 70 to 30, an invert emulsifier to stabilize the water in oil emulsion, a 16 to 18 carbon carboxylic acid, wherein the 16 to 18 carbon carboxylic acid includes an 18 carbon carboxylic acid having the formula illustrated by Formula 3, a 36 carbon fatty dimer diamine having the formula illustrated by Formula 2, a filtration control agent, and an inorganic mineral including one or more of lime, calcium chloride, and barite.

In various embodiments, the fluid can be substantially free of clay. In various embodiments, the fluid can be substantially free of low gravity solids.

In various embodiments, the fluid can be formulated to be approximately 90 lbm/ft$^3$. In various embodiments, the fluid can be formulated to have from 63 to 134 lbm/ft$^3$.

In various embodiments, the fluid can be formulated to have an oil to water ratio of approximately 95 to 5 to approximately 5 to 95.

In various embodiments, the fluid can be formulated to have a CaCl$_2$ water phase salinity concentration of approximately 250 thousand parts per million. In various embodiments, the fluid can be formulated to have a CaCl$_2$ water phase salinity concentration of approximately 200 to 390 thousand parts per million.

In various embodiments, the fluid can be formulated to have approximately 10 lbm/bbl of the invert emulsifier. In various embodiments, the fluid can be formulated to have approximately 2 to 25 lbm/bbl of the invert emulsifier. In various embodiments, the invert emulsifier can be any type of operable invert emulsifier. By way of example and not limitation, types of invert emulsifiers can include polyamides, sulfates, sulfonates, and carboxylates with hydrophile-lipophile balance value of less than 11. In various embodiments, the invert emulsifier can be any suitable invert emulsifier for formulating drilling fluids.

In various embodiments, the fluid can be formulated to have approximately 1.5 lbm/bbl of lime. In various embodiments, the fluid can be formulated to have approximately 1 to 3 lbm/bbl of lime.

In various embodiments, the fluid can be formulated to have at least approximately 3 lbm/bbl of the 16 to 18 carbon carboxylic acid. In various embodiments, the fluid can be formulated to have at least approximately 1.5 to 5 lbm/bbl of the 16 to 18 carbon carboxylic acid.

In various embodiments, the fluid can be formulated to have approximately 2 lbm/bbl of the filtration control agent. In various embodiments, the fluid can be formulated to have approximately 1-3 lbm/bbl of the filtration control agent. In various embodiments, the filtration control agent can be ADAPTA® filtration control agent. In various embodiments, the filtration control agent can be any suitable filtration control agent for formulating drilling fluids.

In various embodiments, the fluid can be formulated to have approximately 28-32 lbm/bbl of calcium chloride. In various embodiments, the fluid can be formulated to have approximately 83-87 lbm/bbl of water.

In various embodiments, the fluid can be formulated to have at least approximately 1.5 lbm/bbl of the 36 carbon fatty dimer diamine. In various embodiments, the fluid can be formulated to have approximately 1 to 3 lbm/bbl of the 36 carbon fatty dimer diamine.

In various embodiments, the oil can be selected from the group consisting of mineral oil, diesel fuel, and synthetic oil, and combinations thereof.

In various embodiments, the fluid can be formulated to have approximately 220-225 lbm/bbl of barite.

In various embodiments, the fluid can be formulated to have a yield point greater than approximately 15 lbf/100 ft$^2$. In various embodiments, the fluid can be formulated to have a low shear yield point greater than approximately 7 lbf/100 ft$^2$.

EXAMPLES

The present disclosure describes compositions for invert emulsion fluids (IEFs) with fatty acid and fatty amine rheology modifiers as illustrated and described here in the examples.

In the various examples provided here, selected IEFs that are substantially free of organoclay were formulated. The fluids were formulated to be 90 pounds per cubic foot (pcf) fluids with an oil to water ratio (OWR) of 70:30 and a CaCl$_2$ water phase salinity (WPS) concentration of 250 thousand parts per million (Kppm).

In a first set of examples, a C36 fatty dimer diacid was used alone in formulations as a rheology modifier to provide a baseline of performance of IEF's without the combination of rheological modifiers, as disclosed and described here for various embodiments and examples. The C36 fatty dimer diacid was used to formulate various 90 pcf IEFs that are substantially free of organoclay and has the chemical structure shown in Formula 1.

Table 1A provides formulation data for four IEFs with different amounts of Formula 1. No C36 fatty dimer diamine was added to these four IEFs. The formulations are labeled as Fluids 1-4. For each formulation, 150.3 barrels of a mineral oil (available from Safra Company Limited, headquartered in Jeddah, Saudi Arabia) was added to a mixing tank. To the mineral oil an invert emulsifier (LE SUPERMUL™, available from Halliburton Company, headquartered in Houston, Tex., USA) was added in an amount of 10 pounds per barrel (ppb), followed by mixing for 5 minutes. Lime was added to this mixture in an amount of 1.5 ppb, followed by mixing for 5 minutes. Varying amounts of Formula 1 were added to this mixture, followed by mixing for 5 minutes. The amounts of Formula 1 for Fluids 1-4 were 1.5 ppb, 3 ppb, 5 ppb, and 7 ppb, respectively. A filtration control agent (ADAPTA®) was added to this mixture in an amount of 2 ppb, followed by mixing for 5 minutes. The filtration control agent is a cross-linked methylstyrene/acrylate copolymer and is to control fluid loss while minimizing impacts on plastic viscosity. Calcium chloride was added to this mixture in an amount of 29.6 ppb and water in an amount of 85.3 ppb, followed by mixing for 5 minutes. Barite was added to this mixture in an amount of 223.7 ppb, followed by mixing for 10 minutes. Each formulation was hot rolled (placed in a pressurized high temperature and pressure cell and rolled at 250° F. for 16 hours after all components were added to the formulation).

TABLE 1A

| Fluid formulation component in order of addition | Mixing Time after addition (min) | Fluid 1 | Fluid 2 | Fluid 3 | Fluid 4 |
| --- | --- | --- | --- | --- | --- |
| Safra oil (bbl) | — | 150.3 | 150.3 | 150.3 | 150.3 |
| Emulsifier (ppb) (LE SUPERMUL ™) | 5 | 10 | 10 | 10 | 10 |
| LIME (ppb) | 5 | 1.5 | 1.5 | 1.5 | 1.5 |
| Rheology Agent - C36 fatty dimer diacid (ppb) | 5 | 1.5 | 3 | 5 | 7 |
| Filtration Control Agent (ppb) (ADAPTA ®) | 5 | 2 | 2 | 2 | 2 |
| CaCl$_2$ (ppb) | 5 | 29.6 | 29.6 | 29.6 | 29.6 |
| Water (ppb) | | 85.3 | 85.3 | 85.3 | 85.3 |
| Barite (ppb) | 10 | 223.7 | 222.7 | 220.7 | 220.7 |
| Rheology Agent - C36 fatty dimer diamine (ppb) | — | 0 | 0 | 0 | 0 |

Each of the four IEFs of Table 1A were tested in a standard oilfield viscometer at 3, 6, 100, 200, 300, and 600 rpm, and further were tested for gel strength and High Temperature High Pressure (HTHP) fluid loss. An example of a standard oilfield viscometer can include a FANN®

Model 35 Viscometer, available from Fann Instrument Company, headquartered in Houston, Tex., USA. The rheology of the drilling fluid formulations was measured according to American Petroleum Institute (API) Recommended Practice 13B-2 (RP 13B-2) Section 6.3, Recommended Practice for Field Testing of Oil-based Drilling Fluids. A sample of each of drilling fluids was placed in a thermostatically controlled viscometer cup. An empty volume of approximately 100 cubic centimeter ($cm^3$) was left in the cup to account for the displacement of the fluid due to the viscometer bob and sleeve. Measurements were made with minimum delay from the time of preparation of the drilling fluid sample. Tests were carried out at either 50±1° C. (120±1° F.). The temperature of the sample was monitored and intermittent or constant shear at 600 rpm was used to stir the sample and obtain a uniform sample temperature. With the sleeve rotating at 600 rpm, the viscometer dial reading was allowed to reach a steady value and the required time to reach steady value depends on the characteristics of the drilling fluid sample. The dial reading of the viscometer at 600 rpm was recorded. The rotor speed was reduced to 300 rpm. The viscometer dial reading was allowed to reach a steady value and the dial reading at 300 rpm was recorded. The rotor speed was subsequently reduced to 200 rpm, 100 rpm, 6 rpm, and 3 rpm, and at each one of these foregoing rotational speeds, the viscometer dial reading was allowed to reach a steady value and the dial readings at 200 rpm, 100 rpm, 6 rpm, and 3 rpm were recorded. From the various measurements collected during this test, PV, YP, and LSYP were calculated for the four fluids and are shown in Table 1B.

The gel strength of the drilling fluids was also measured according to the API RP 13B-2, Section 6.3. A sample of each of drilling fluids was placed in the viscometer for testing as described previously. The drilling fluid was stirred at 600 rpm for ten seconds and the drilling fluid sample was allowed to stand undisturbed for ten seconds. The handwheel of the viscometer was turned slowly and steadily to produce a positive dial reading and the maximum reading thus obtained was recorded as the initial gel strength (10-second gel) in pound force per hundred square feet. The drilling fluid sample was restirred at 600 rpm for ten seconds and the drilling fluid sample was allowed to stand undisturbed for ten minutes. The measurements were repeated as described in this paragraph for the initial gel strength. The maximum reading now obtained was recorded as the ten-minute gel strength in pound force per hundred square feet. The gel strengths for the four drilling fluids are shown in Table 1B.

The HTHP fluid loss was measured according to the API RP 13B-2, Section 7.2. The HTHP fluid loss test measures static filtration behavior of drilling fluid at elevated temperatures, such as 250° F. This test was conducted using a HTHP filter press unit containing a filter cell, a pressurized gas source, a heating system, a high-pressure filtrate collection vessel (maintained at proper back-pressure), and a filter medium. The drilling fluid sample was stirred for five minutes using a field mixer and then poured into the filter cell, leaving at least 2.5 centimeters of space in the cell to allow for fluid expansion. The filter paper was installed in the cell and the filter cell was assembled with both top and bottom valves closed. The filter cell was placed inside the HTHP filter press unit with appropriate connections to the high-pressure filtrate collection vessel and the regulated pressurized gas source. The temperature of the drilling fluid sample inside the filter cell was maintained at the test temperature of 250° F. A pressure of about 100 pounds per square inch (psi) was maintained until the test temperature of 250° F. was reached. Then, the pressure of the drilling fluid sample inside the filter cell was increased to the test pressure of 500 psi and the timer for the filtration process was started. The filtrate was collected in the filtrate collection vessel for thirty minutes, and the volume of the filtrate was measured in milliliters (mL) using a graduated cylinder. The filtrate volume should be corrected to a filter area of 45.8 square centimeters ($cm^2$). HTHP filter cells usually have half the standard filter area or 22.58 $cm^2$, thus the observed volume is usually doubled and reported. The HTHP fluid loss measurements using this test for the four drilling fluids are shown in Table 1B.

TABLE 1B

| Test | Fluid 1 | Fluid 2 | Fluid 3 | Fluid 4 |
|---|---|---|---|---|
| 600 rpm (cP) | 36 | 45 | 40 | 38 |
| 300 rpm (cP) | 23 | 29 | 26 | 27 |
| 200 rpm (cP) | 19 | 21 | 19 | 21 |
| 100 rpm (cP) | 13 | 13.5 | 13 | 16 |
| 6 rpm (cP) | 4 | 3 | 4 | 7 |
| 3 rpm (cP) | 3 | 2 | 3 | 5 |
| PV (cP) | 13 | 16 | 14 | 11 |
| YP (lbf/100 $ft^2$) | 10 | 13 | 12 | 16 |
| LSYP (lbf/100 $ft^2$) | 2 | 1 | 2 | 3 |
| Gel Strength - 10 sec, (lbf/100 $ft^2$) | 5.1 | 3 | 4.3 | 5 |
| Gel Strength - 10 min, (lbf/100 $ft^2$) | 3.6 | 3.3 | 4.7 | 4 |
| HTHP fluid loss - 250° F., 500 psi, 30 min (mL) | 6 | 4 | 4 | 3 |

FIG. 1 graphically illustrates the plastic viscosity, the yield point, and the low shear yield point data of the four fluids of Table 1A. As can be seen in Table 1B and in FIG. 1, the YP and LSYP values remain relatively flat with increasing amounts of C36 dimer diacid from 1.5 ppb to 7.0 ppb. This data indicates that C36 dimer diacid by itself does not appear to significantly impact the YP and LSYP values. Generally, for a good drilling fluid, LSYP value greater than or equal to 7 lbf/100 $ft^2$ is required, as noted previously. A larger LSYP value for the drilling fluid ensures good hole cleaning and greater barite sag resistance. Accordingly, Formula 1 by itself does not appear to impact the fluid rheology in a positive manner for drilling fluid purposes.

In a second set of examples, Formula 1 and a C36 fatty dimer diamine were used as a rheology modifier combination to formulate four IEFs that are substantially free of organoclay. The C36 fatty dimer diamine has the chemical structure shown in Formula 2.

Table 2A provides formulation data for four IEFs with different amounts of Formula 1 and Formula 2. The formulations are labeled as Fluids 1-4. For each formulation, 150.3 barrels of a mineral oil (available from Safra Company Limited, headquartered in Jeddah, Saudi Arabia) was added to a mixing tank. To the mineral oil an invert emulsifier (LE SUPERMUL™) was added in an amount of 10 ppb, followed by mixing for 5 minutes. Lime was added to this mixture in an amount of 1.5 ppb, followed by mixing for 5 minutes. Varying amounts of Formula 1 were added to this mixture, followed by mixing for 5 minutes. The amounts of Formula 1 for Fluids 1-4 were 1.5 ppb, 0, 1.5 ppb, and 1.5 ppb, respectively. A filtration control agent (ADAPTA®) was added to this mixture in an amount of 2 ppb, followed by mixing for 5 minutes. The filtration control agent is a cross-linked methylstyrene/acrylate copolymer and is to control fluid loss while minimizing impacts on plastic viscosity. $CaCl_2$ was added to this mixture in an amount of 29.6 ppb and water in an amount of 85.3 ppb, followed by mixing for 5 minutes. Barite was added to this mixture in an amount of 223.7, 223.7, 223.7, 220.7 ppb (Fluids 1-4, respectively), followed by mixing for 10 minutes. Varying amounts of Formula 2 to this mixture were added, followed by mixing for 5 minutes. The amounts of Formula 2 for Fluids 1-4 were 0, 1.5 ppb, 1.5 ppb, and 3 ppb, respectively. Each formulation was hot rolled (placed in a pressurized high temperature and pressure cell and rolled at 250° F. for 16 hours after all components were added to the formulation).

TABLE 2A

| Fluid formulation component in order of addition | Mixing Time after addition (min) | Fluid 1 | Fluid 2 | Fluid 3 | Fluid 4 |
| --- | --- | --- | --- | --- | --- |
| Safra oil (bbl) | — | 150.3 | 150.3 | 150.3 | 150.3 |
| Emulsifier (ppb) (LE SUPERMUL ™) | 5 | 10 | 10 | 10 | 10 |
| LIME (ppb) | 5 | 1.5 | 1.5 | 1.5 | 1.5 |
| Rheology Agent - C36 fatty dimer diacid (ppb) | 5 | 1.5 | 0 | 1.5 | 1.5 |
| Filtration Control Agent (ppb) (ADAPTA ®) | 5 | 2 | 2 | 2 | 2 |
| CaCl$_2$ (ppb) | 5 | 29.6 | 29.6 | 29.6 | 29.6 |
| Water (ppb) | | 85.3 | 85.3 | 85.3 | 85.3 |
| Barite (ppb) | 10 | 223.7 | 222.7 | 220.7 | 220.7 |
| Rheology Agent - C36 fatty dimer diamine (ppb) | 5 | 0 | 1.5 | 1.5 | 3 |

Each of the four IEFs of Table 2A were tested in a standard oilfield viscometer at 3, 6, 100, 200, 300, and 600 rpm, and further were tested for gel strength and HTHP fluid loss. Gel Strength test and the HTHP fluid loss test were performed as described previously for the first example set of IEFs. From the test data, PV, YP, and LSYP were calculated and are shown in Table 2B for the four fluids of Table 2A.

TABLE 2B

| Test | Fluid 1 | Fluid 2 | Fluid 3 | Fluid 4 |
| --- | --- | --- | --- | --- |
| 600 rpm (cP) | 36 | 34 | 49 | 74 |
| 300 rpm (cP) | 23 | 20 | 36 | 52 |
| 200 rpm (cP) | 19 | 14 | 29 | 43 |
| 100 rpm (cP) | 13 | 9 | 21 | 31 |
| 6 rpm (cP) | 4 | 1 | 9 | 10 |
| 3 rpm (cP) | 3 | 1 | 8 | 9 |
| PV (lbf/100 ft$^2$) | 13 | 14 | 13 | 22 |
| YP (lbf/100 ft$^2$) | 10 | 6 | 23 | 30 |
| LSYP (lbf/100 ft$^2$) | 2 | 1 | 7 | 8 |
| Gel Strength - 10 sec, (lbf/100 ft2) | 5.1 | 1.9 | 7 | 10 |
| Gel Strength - 10 min, (lbf/100 ft$^2$) | 3.6 | 2.6 | 9 | 12 |
| HTHP fluid loss - 250 F, 500 psi, 30 min (mL) | 6 | 2 | 2 | 2 |

Figure 2:
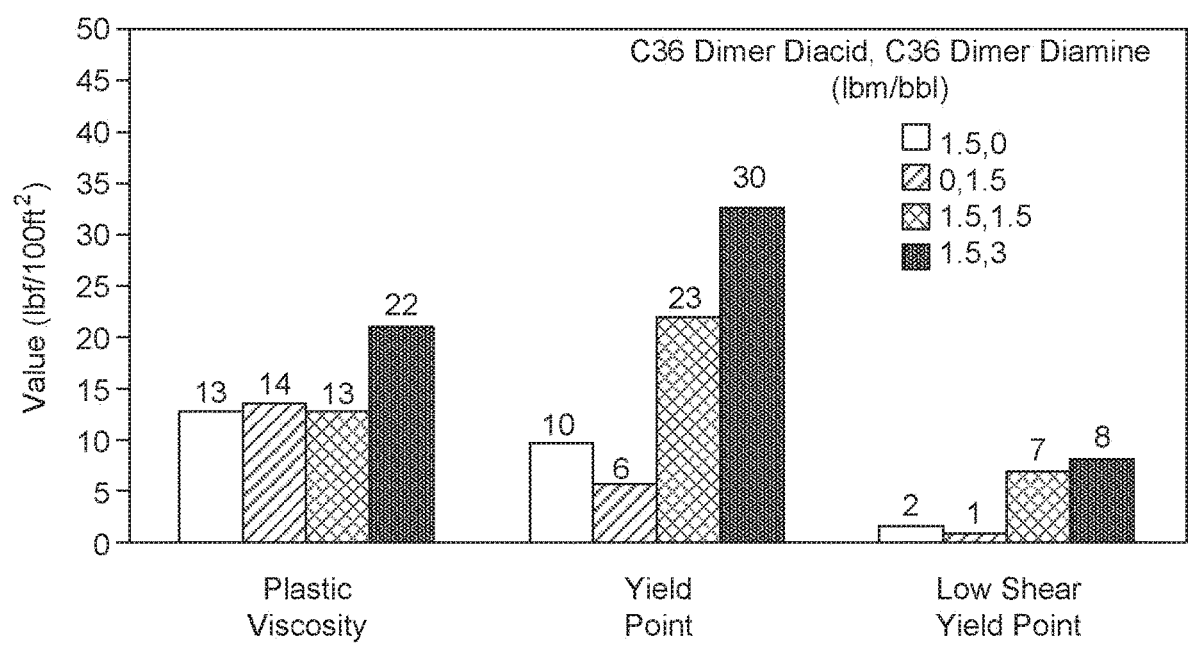
FIG. 2 is a graphical representation of PV, YP, and LSYP data of the four fluids described in Table 2A, in accordance with various embodiments.

FIG. 2 graphically illustrates PV, YP, and LSYP data of the four fluids of Table 2A, in accordance with various embodiments. As can be seen in Table 2B and in FIG. 2, the YP values for Fluids 1 and 2 are lesser in comparison to the YP values for Fluids 3 and 4 (10 and 6 versus 23 and 30, respectively). Additionally, the LSYP values for Fluids 1 and 2 are significantly lesser than the threshold of 7 lbf/100 ft$^2$ (1 and 4) in contrast to values of 7 and 8 lbf/100 ft$^2$ for Fluids 3 and 4. As Fluid 1 contains Formula 1 but no Formula 2, and Fluid 2 contains Formula 2 but no Formula 1, Formula 1 and Formula 2 used alone as rheology modifiers are inadequate. In contrast, when both Formula 1 and Formula 2 are added to a formulation as shown for Fluids 3 and 4, there is a synergistic and large impact upon YP and LSYP, jumping from values of 6-10 to values of 23-30 for YP and from values of 1-2 to values of 7-8 for LSYP. This result is disproportionate to the dosages as the dosages for Fluid 3 is the same for Fluid 1 and Fluid 2, namely, 1.5 ppb of both Formula 1 and Formula 2. The doubling of Formula 2 from 1.5 ppb to 3 ppb for Fluid 4 further increases YP and LSYP; however, the values may have plateaued for LSYP as the increase is only from 7 to 8 for LSYP. Notably, the PV value of Fluid 3 is about the same as for Fluids 1 and 2. In summary, this data shows that Formula 1 combined with Formula 2 improves fluid rheology disproportionately and unexpectedly for drilling fluid purposes, indicating a synergism between the two rheology modifiers.

In a third example set of IEFs, a C16-C18 fatty acid and Formula 2 were used as a rheology modifier combination to formulate various 90 pcf IEFs that are substantially free of organoclay. The C18 portion of the fatty acid has the chemical structure shown in Formula 3. The C16 portion of the fatty acid has two less carbons in the linear chain as compared to Formula 3.

Table 3A provides formulation data for three IEFs with different amounts of Formula 2 and Formula 3. The formulations are labeled as Fluids 1-3. For the formulation of Fluids 1-3, 146.7, 144.4, and 144.3 barrels of a mineral oil (available from Safra Company Limited, headquartered in Jeddah, Saudi Arabia) was added to a mixing tank, respectively. An invert emulsifier (LE SUPERMUL™) in an amount of 10 ppb was added to the mineral oil, followed by mixing for 5 minutes. Lime in an amount of 1.5 ppb was added to the mixture, followed by mixing for 5 minutes. Varying amounts of Formula 3 were added to the mixture, followed by mixing for 5 minutes. The amounts of Formula 3 for Fluids 1-3 were 0, 4.5 ppb, and 3 ppb, respectively. A filtration control agent (ADAPTA®) in an amount of 2 ppb was added to the mixture, followed by mixing for 5 minutes. The filtration control agent is a cross-linked methylstyrene/acrylate copolymer and is to control fluid loss while minimizing impacts on plastic viscosity. CaCl$_2$ in varying amounts of 29.5 ppb, 29.5 ppb, and 29.6 ppb (for Fluids 1-3, respectively), and water, in an amount of 84.9 ppb, 84.9 ppb, and 85.3 ppb (for Fluids 1-3, respectively), were added to the mixture, followed by mixing for 5 minutes. Barite in an amount of 229.5 ppb, 228.9 ppb, and 228.9 ppb (for Fluids 1-3, respectively) was added to the mixture, followed by mixing for 10 minutes. Varying amounts of Formula 2 were added to the mixture, followed by mixing for 5 minutes. The amounts of Formula 2 for Fluids 1-3 were 1.5 ppb, 0, and 1.5 ppb, respectively. Each formulation was hot rolled, which included placing the mixture in a pressurized high temperature and pressure cell and rolled at 250° F. for 16 hours after all components were added to the formulation).

TABLE 3A

| Fluid formulation component in order of addition | Mixing Time after addition (min) | Fluid 1 | Fluid 2 | Fluid 3 |
| --- | --- | --- | --- | --- |
| Safra oil (bbl) | — | 146.7 | 144.4 | 144.3 |
| Emulsifier (ppb) (LE SUPERMUL ™) | 5 | 10 | 10 | 10 |
| LIME (ppb) | 5 | 1.5 | 1.5 | 1.5 |
| Rheology Agent - C16-C18 fatty acid (ppb) | 5 | 0 | 4.5 | 3 |
| Filtration Control | 5 | 2 | 2 | 2 |

TABLE 3A-continued

| Fluid formulation component in order of addition | Mixing Time after addition (min) | Fluid 1 | Fluid 2 | Fluid 3 |
|---|---|---|---|---|
| Agent (ppb) (ADAPTA ®) | | | | |
| CaCl$_2$ (ppb) | 5 | 29.5 | 29.5 | 29.6 |
| Water (ppb) | | 84.9 | 84.9 | 85.3 |
| Barite (ppb) | 10 | 229.5 | 228.9 | 228.9 |
| Rheology Agent - C36 fatty dimer diamine (ppb) | 5 | 1.5 | 0 | 1.5 |

Each of the three IEFs of was added to the mixture were tested in a standard oilfield viscometer at 3, 6, 100, 200, 300, and 600 rpm, and further were tested for Gel Strength and HTHP fluid loss. Gel Strength test used and the HTHP fluid loss test were the same as for the first set of examples. From the test data, PV, YP, and LSYP were calculated and are shown in Table 3B for the four fluids of Table 3A.

TABLE 3B

| Test | Fluid 1 | Fluid 2 | Fluid 3 |
|---|---|---|---|
| 600 rpm (cP) | 34 | 65 | 62 |
| 300 rpm (cP) | 20 | 38 | 44 |
| 200 rpm (cP) | 14 | 27 | 36 |
| 100 rpm (cP) | 9 | 18 | 26 |
| 6 rpm (cP) | 1 | 6 | 13 |
| 3 rpm (cP) | 1 | 5 | 11 |
| PV (lbf/100 ft$^2$) | 14 | 27 | 18 |
| YP (lbf/100 ft$^2$) | 6 | 11 | 26 |
| LSYP (lbf/100 ft$^2$) | 1 | 4 | 9 |
| Gel Strength - 10 sec (lbf/100 ft$^2$) | 1.9 | 5 | 14 |
| Gel Strength - 10 min, (lbf/100 ft$^2$) | 2.6 | 6 | 19 |
| HTHP fluid loss - 250 F, 500 psi, 30 min (mL) | 4 | 6 | 4 |

Figure 3:
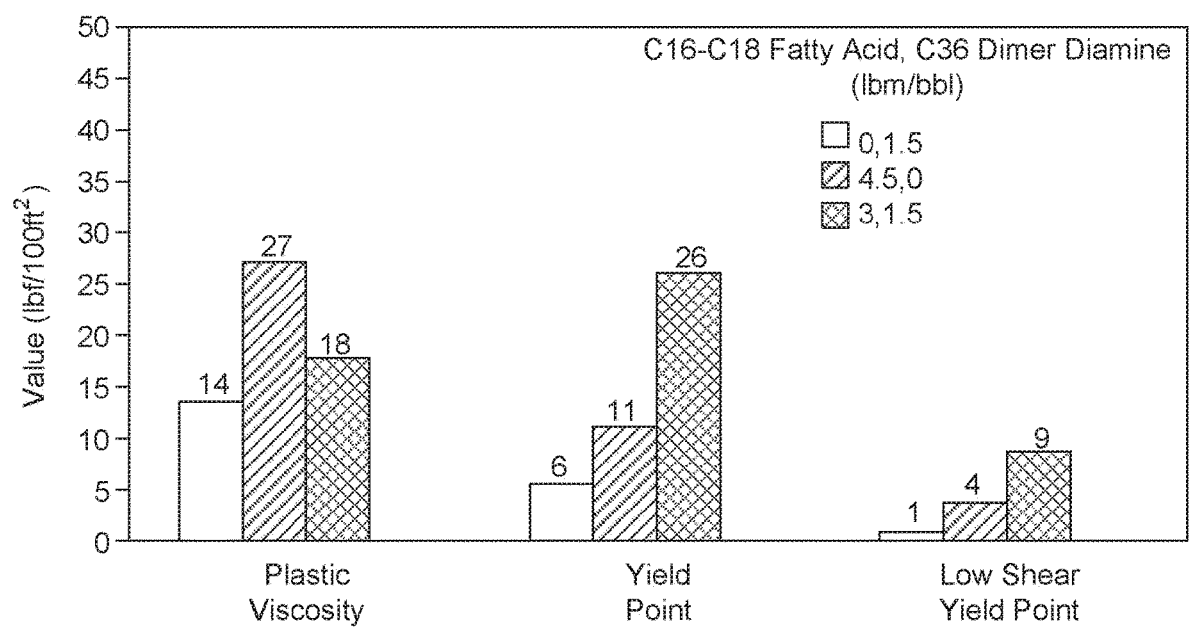
FIG. 3 is a graphical representation of PV, YP, and LSYP data of the four fluids described in Table 3A, in accordance with various embodiments.

FIG. 3 graphically illustrates the PV, YP, and LSYP data of the four fluids of Table 3A, in accordance with various embodiments. As can be seen in Table 3B and in FIG. 3, the YP values for Fluid 1 and 2 are low in comparison to the YP value for Fluid 3 (6 and 11 versus 26). Additionally, the LSYP values for Fluid 1 and Fluid 2 are significantly lesser the threshold of 7 lbf/100 ft$^2$ (1 and 4) in contrast to the value of 9 lbf/100 ft$^2$ for Fluid 3. As Fluid 1 contains Formula 2 (diamine, 1.5 ppb) but no Formula 3 (fatty acid) and Fluid 2 contains Formula 3 (fatty acid, 4.5 ppb) but no Formula 2 (diamine), Formula 3 and Formula 2 used alone as rheology modifiers are inadequate for the formulations of Fluids 1 and 2. In contrast, when both Formula 3 and Formula 2 are added to a formulation as shown for Fluid 3, there is a synergistic and large impact upon YP and LSYP. YP jumps from values of 6 and 11 to a value of 26. LSYP jumps from values of 1 and 4 to value of 9. These results are disproportionate to the dosages as the dosage of Formula 3 for Fluid 3 is less than Fluid 2 and the dosage of Formula 2 for Fluid 3 is the same as for Fluid 1. Accordingly, Formula 3 combined with Formula 2 improves fluid rheology disproportionately and unexpectedly for drilling fluid purposes, indicating a synergism between the two rheology modifiers.

In a fourth example set, a C16-C18 fatty acid and a fatty dimer diamine were used as a rheology modifier combination to formulate a 95 pcf IEF that is substantially free of organoclay. The C18 portion of the fatty acid has the chemical structure shown in Formula 3. The C16 portion of the fatty acid has two less carbons in the linear chain as compared to Formula 3.

Table 4A provides formulation data for an IEF which is substantially free of organoclay and is acid-soluble. The formulation is labeled as Fluid 1. For Fluid 1, 150.6 ppb of a diesel base oil was added to a mixing tank. An invert emulsifier (LE SUPERMUL™) in an amount of 14 ppb was added to the diesel oil, followed by mixing for 5 minutes. Lime in an amount of 2.5 ppb was added to the mixture, followed by mixing for 5 minutes. The C16-C18 fatty acid in an amount of 0.3 ppb was added to the mixture, followed by mixing for 5 minutes. A filtration control agent (BDF™-513, available from Halliburton Company, headquartered in Houston, Tex., USA) in an amount of 4 ppb was added to the mixture, followed by mixing for 5 minutes. The filtration control agent is a cross-linked methylstyrene/acrylate copolymer and is to control fluid loss while minimizing impacts on plastic viscosity. Water in an amount of 83.1 ppb and CaCl$_2$ in an amount of 24.4 ppb were added to the mixture, followed by mixing for 5 minutes. A viscosifier (TAU-MOD®, available from Halliburton Company, headquartered in Houston, Tex., USA) in an amount of 1.5 ppb was added to the mixture, followed by mixing for 5 minutes. A weighting agent including manganese tetroxide in an amount of 212.4 ppb was added to the mixture, followed by mixing for 10 minutes. A fatty dimer diamine (Priamine™ 1074, available from Croda International PLC, headquartered at Snaith, Goole, United Kingdom) in an amount of 0.3 ppb was added to the mixture, followed by mixing for 5 minutes. The fatty dimer diamine had the general formula illustrated by Formula 4. A wetting agent (DRILTREAT®, available from Halliburton Company, headquartered in Houston, Tex., USA) in an amount of 0.5 ppb was added to the mixture, followed by mixing for 5 minutes. Three types of bridging agents (BARACARB® 25, 50, and 150, available from Halliburton Company, headquartered in Houston, Tex., USA) in an amount of 11 ppb, 25 ppb, and 4 ppb, respectively, were added to the mixture, followed by mixing for 5 minutes. The bridging agents include sized-ground marble which is acid-soluble. BARACARB® 25 has a median particle size of 25 microns, BARACARB® 50 has a median particle size of 50 microns, and BARACARB® 150 has a median particle size of 150 microns. The formulation was hot rolled, which included placing the mixture in a pressurized high temperature and pressure cell and rolled at 300° F. and 150 psi for 16 hours after all components were added to the formulation.

TABLE 4A

| Fluid formulation component in order of addition | Mixing Time after addition (min) | Fluid 1 |
|---|---|---|
| Diesel Base Oil (ppb) | — | 150.6 |
| Emulsifier (ppb) (LE SUPERMUL ™) | 5 | 14 |
| Lime (ppb) | 5 | 2.5 |
| C16-C18 Fatty Acid (ppb) | 5 | 0.3 |
| Filtration Control Agent (ppb) (BDF ™-513) | 5 | 4 |
| Water (ppb) | 5 | 83.1 |
| CaCl$_2$ (ppb) | | 24.4 |
| Viscosifier (ppb) (TAU-MOD ®) | 5 | 1.5 |
| Weighting Agent (ppb) (Manganese Tetroxide) | 10 | 212.4 |
| Fatty Dimer Diamine (ppb) (Priamine ™ 1074) | 5 | 0.3 |
| Wetting Agent (ppb) (DRILTREAT ®) | 5 | 0.5 |
| Bridging Agent (ppb) | 5 | 11 |

TABLE 4A-continued

| Fluid formulation component in order of addition | Mixing Time after addition (min) | Fluid 1 |
|---|---|---|
| (BARACARB ® 25) Bridging Agent (ppb) | | 25 |
| (BARACARB ® 50) Bridging Agent (ppb) | | 4 |
| (BARACARB ® 150) | | |

The IEF was tested in a standard oilfield viscometer at 3, 6, 100, 200, 300, and 600 rpm, and further was tested for gel strength and HTHP fluid loss. Gel strength test and the HTHP fluid loss test were performed as described previously for the first example set of IEFs. From the test data, PV, and YP, were calculated and are shown in Table 4B for Fluid 1 of Table 4A.

TABLE 4B

| Test | Fluid 1 |
|---|---|
| 600 rpm (cP) | 80 |
| 300 rpm (cP) | 48 |
| 200 rpm (cP) | 36 |
| 100 rpm (cP) | 24 |
| 6 rpm (cP) | 8 |
| 3 rpm (cP) | 6 |
| PV (lbf/100 ft$^2$) | 32 |
| YP (lbf/100 ft$^2$) | 16 |
| Gel Strength - 10 sec (lbf/100 ft$^2$) | 6 |
| Gel Strength - 10 min (lbf/100 ft$^2$) | 9 |
| HTHP Fluid Loss - 300 F, 500 psi, 30 min (mL) | 2 |
| Permeability Plugging Apparatus (PPA) Total Fluid Loss - 300 F, 1500 psi, 35 micron filter disc, 30 min (mL) | 0.4 |
| Static Aging - Sag Factor, 300 F | 0.528 |

As can be seen in Table 4B, the YP value of 16 lbf/100 ft$^2$ for Fluid 1 is greater than the threshold value of 15 lbf/100 ft$^2$. Accordingly, Fluid 1 shows improved fluid rheology for drilling fluid purposes using a combination of two rheology modifiers, the C16-C18 fatty acid and the fatty dimer diamine, along with manganese tetroxide as the weighting agent and size-specific combination of the acid-soluble bridging agents. Advantageously, Fluid 1 shows a reduced equivalent circulating density (ECD), improved barite sag resistance, acid solubility of the filter cake suitable for reservoir drilling, and ability to plug high permeability formations preventing stuck pipes.

Ranges may be expressed herein as from about one particular value and to about another particular value. When such a range is expressed, it is to be understood that another embodiment is from the one particular value and/or to the other particular value, along with all combinations within said range. Where the range of values is described or referenced herein, the interval encompasses each intervening value between the upper limit and the lower limit as well as the upper limit and the lower limit and includes smaller ranges of the interval subject to any specific exclusion provided.

Where a method comprising two or more defined steps is recited or referenced herein, the defined steps can be carried out in any order or simultaneously except where the context excludes that possibility.

While various embodiments have been described in detail for the purpose of illustration, they are not to be construed as limiting, but are intended to cover all the changes and modifications within the spirit and scope thereof.

What is claimed is:

1. A method of drilling a wellbore with an invert emulsion drilling fluid, the method comprising the step of:
   drilling in a formation using the invert emulsion drilling fluid, the invert emulsion drilling fluid comprising:
   a water in oil emulsion;
   an invert emulsifier to stabilize the water in oil emulsion in an amount operable to stabilize the water in oil emulsion;
   a C16 to C18 saturated linear alpha carboxylic acid;
   a fatty dimer diamine;
   a filtration control agent;
   a weighting agent comprising manganese tetroxide; and
   a bridging agent comprising calcium carbonate,
   wherein the bridging agent is a mixture of acid-soluble marble having median particle sizes of 25, 50, and 150 microns in an amount of 5 to 15, 20 to 30, and 2 to 6 lbm/bbl, respectively.

2. The method of claim 1, wherein the invert emulsion drilling fluid further comprises a 36 carbon dimer diacid having the formula

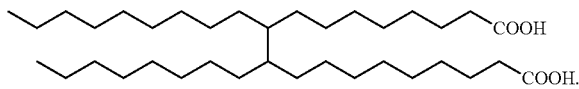 [SMILES: CCCCCCCCCC(CCCCCCCC(=O)O)C(CCCCCCCC)CCCCCCCCC(=O)O]

3. The method of claim 2, wherein the invert emulsion drilling fluid is formulated to have the 36 carbon dimer diacid in an amount of 0.5 to 5 lbm/bbl.

4. The method of claim 1, wherein the fatty dimer diamine has the formula

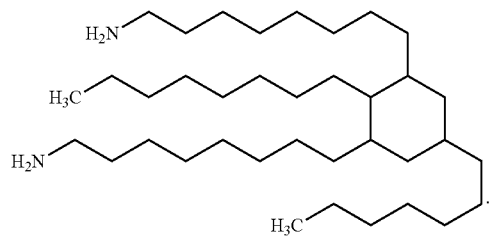 [SMILES: CCCCCCCCC1C(CCCCCCCCN)CC(CCCCCCC)CC1CCCCCCCCN]

5. The method of claim 1, wherein the invert emulsion drilling fluid is formulated to have an oil to water ratio from 5:95 to 95:5 by volume.

6. The method of claim 1, wherein the invert emulsion drilling fluid is formulated to have a density ranging from 65 to 150 lbm/ft$^3$.

7. The method of claim 1, wherein the invert emulsion drilling fluid is formulated without organoclay.

8. The method of claim 1, wherein the invert emulsion drilling fluid is formulated to have the invert emulsifier in an amount of 2 to 25 lbm/bbl.

9. The method of claim 1, wherein the invert emulsion drilling fluid further comprises lime.

10. The method of claim 9, wherein the invert emulsion drilling fluid is formulated to have the lime in an amount of 0.5 to 5 lbm/bbl.

11. The method of claim 1, wherein the invert emulsion drilling fluid is formulated to have the filtration control agent in an amount of 0.25 to 5 lbm/bbl.

12. The method of claim 1, wherein the invert emulsion drilling fluid is formulated to have a 6 rpm reading of at least 8 cP.

13. The method of claim 1, wherein the invert emulsion drilling fluid is formulated to have the fatty dimer diamine in an amount of 1 to 10 lbm/bbl.

14. The method of claim 1, wherein the oil is selected from the group consisting of mineral oil, diesel fuel, and synthetic oil, and combinations thereof.

15. The method of claim 1, wherein the invert emulsion drilling fluid is formulated to have a yield point greater than 15 lbf/100 ft$^2$.

16. The method of claim 1, wherein the invert emulsion drilling fluid is formulated to have a low shear yield point greater than 7 lbf/100 ft$^2$.

17. The method of claim 1, wherein the invert emulsion drilling fluid is formulated to have the weighting agent in an amount of 50 to 600 lbm/bbl.

18. The method of claim 1, wherein the weighting agent further includes one selected from the group consisting of: barite, calcium carbonate, and combinations thereof.

19. The method of claim 1, wherein the invert emulsion drilling fluid has the C16 to C18 saturated linear alpha carboxylic acid in an amount of 0.1 to 0.5 lbm/bbl.

20. A method of drilling a wellbore with an invert emulsion drilling fluid, the method comprising the step of:
 drilling in a formation using the invert emulsion drilling fluid, the invert emulsion drilling fluid comprising:
  a water in oil emulsion;
  an invert emulsifier to stabilize the water in oil emulsion in an amount operable to stabilize the water in oil emulsion;
  a C16 to C18 saturated linear alpha carboxylic acid;
  a 36 carbon dimer diacid having the formula

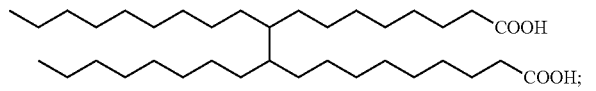 [SMILES: CCCCCCCCCC(CCCCCCCC(=O)O)C(CCCCCCCC)CCCCCCCCC(=O)O]

a fatty dimer diamine;
  a filtration control agent;
  a weighting agent comprising manganese tetroxide; and
  a bridging agent comprising calcium carbonate,
 wherein the invert emulsion drilling fluid is formulated to have the 36 carbon dimer diacid in an amount of 0.5 to 5 lbm/bbl.

21. The method of claim 20, wherein the fatty dimer diamine has the formula

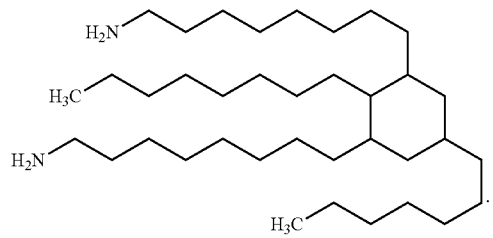

22. The method of claim 20, wherein the invert emulsion drilling fluid is formulated to have an oil to water ratio from 5:95 to 95:5 by volume.

23. The method of claim 20, wherein the invert emulsion drilling fluid is formulated to have a density ranging from 65 to 150 lbm/ft$^3$.

24. The method of claim 20, wherein the invert emulsion drilling fluid is formulated without organoclay.

25. The method of claim 20, wherein the invert emulsion drilling fluid is formulated to have the invert emulsifier in an amount of 2 to 25 lbm/bbl.

26. The method of claim 20, wherein the invert emulsion drilling fluid further comprises lime.

27. The method of claim 26, wherein the invert emulsion drilling fluid is formulated to have the lime in an amount of 0.5 to 5 lbm/bbl.

28. The method of claim 20, wherein the invert emulsion drilling fluid is formulated to have the filtration control agent in an amount of 0.25 to 5 lbm/bbl.

29. The method of claim 20, wherein the invert emulsion drilling fluid is formulated to have a 6 rpm reading of at least 8 cP.

30. The method of claim 20, wherein the invert emulsion drilling fluid is formulated to have the fatty dimer diamine in an amount of 1 to 10 lbm/bbl.

31. The method of claim 20, wherein the oil is selected from the group consisting of mineral oil, diesel fuel, and synthetic oil, and combinations thereof.

32. The method of claim 20, wherein the invert emulsion drilling fluid is formulated to have a yield point greater than 15 lbf/100 ft$^2$.

33. The method of claim 20, wherein the invert emulsion drilling fluid is formulated to have a low shear yield point greater than 7 lbf/100 ft$^2$.

34. The method of claim 20, wherein the invert emulsion drilling fluid is formulated to have the weighting agent in an amount of 50 to 600 lbm/bbl.

35. The method of claim 20, wherein the weighting agent further includes one selected from the group consisting of: barite, calcium carbonate, and combinations thereof.

36. The method of claim 20, wherein the invert emulsion drilling fluid has the C16 to C18 saturated linear alpha carboxylic acid in an amount of 0.1 to 0.5 lbm/bbl.

* * * * *